UNITED STATES PATENT OFFICE 2,454,092

BENZHYDRYL AMINO ETHERS

George Rieveschl, Jr., Grosse Pointe Woods, Mich., assignor to Parke, Davis & Company, Detroit, Mich., a corporation of Michigan No Drawing. Application June 2, 1947, Serial No. 751,983

8 Claims. (Cl. 260—243)

The invention relates to amino ethers and their acid addition salts. This application is a continuation-in-part of my copending application, Serial No. 531,639, filed April 18, 1944, now Patent No. 2,421,714, issued June 3, 1947, and relates to basically substituted benzhydryl ethers and their acid addition salts. The free bases of the basically substituted benzhydryl ethers of the invention have the formula,

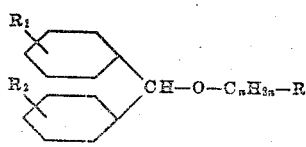

where $n$ is an integer of 2 to 6 inclusive, R is a piperidino, morpholino, thiomorpholino or a pyrrolidino radical and $R_1$ and $R_2$ are the same or different and represent hydrogen, halogen, lower alkyl radicals or lower alkoxy radicals.

The compounds of the present invention may be obtained as a free base having the formula given above or as acid addition salts of the base with inorganic or organic acids. Some examples of the salts which may be prepared by the methods hereinafter described are the hydrochloride, hydrobromide, hydroiodide, sulfate, phosphate, acetate, citrate, oxalate, succinate, benzoate, tartrate, phthalate, maleate, oleate and the like.

The basically substituted benzhydryl ether compounds of the invention may be prepared by several different processes. For example, these compounds may be prepared by the condensation of a benzhydryl halide with an ω-R-substituted aliphatic alcohol. The condensation of these two reactants may be carried out by several different methods, i. e. it may be effected in the presence or absence of an acid-binding agent or with or without a solvent. Another method for preparing these compounds consists in reacting an alkali metal salt of benzhydrol with a ω-R-substituted aliphatic halide or, if desired, the reactants may be interchanged on an alkali metal salt of a ω-R-substituted aliphatic alcohol reacted with a benzhydryl halide. A further method of preparation consists in reacting an ω-haloalkyl benzhydryl ether with a piperidine, morpholine, thiomorpholine or pyrrolidine. Attention is directed to my copending applications, Serial Nos. 688,420, 688,421, 688,422 and 688,423, all filed August 5, 1946, and Serial No. 15,257, filed March 16, 1948, wherein some of the novel features of several of the above processes are more fully described and claimed.

The free bases and the acid addition salts of the basically substituted benzhydryl ethers are, in addition to being useful as intermediates in the synthesis of other organic compounds, powerful antispasmodics and antihistamine agents. As antispasmodics they are useful in preventing smooth muscle spasms induced by histamine, acetyl choline or barium chloride. Another property of these compounds is that they inhibit gastric secretion which has been induced either by meal or histamine stimulus. The new compounds may be administered to humans orally, parenterally, rectally or as a vapor or mist. They find particular use in humans for treatment of allergic conditions (asthma, urticaria, histamine cephalagia and anaphylactic shock) and smooth muscle spasms (biliary spasm and dysmenorrhea). For example, the compound shown in Example 1, β-piperidinoethyl benzhydryl ether hydrochloride, may be administered to humans orally in a dosage of 100 to 600 mg. per day and intravenously in a dosage of 100 to 600 mg. per day and intravenously in a dosage of 10 to 100 mg. per day. However, because of the high activity of this compound and the other compounds of this invention, it has been found that a dosage of 150 mg. per day orally or 20 mg. per day by the intravenous route is usually sufficient in the treatment of smooth muscle spasms and most allergic conditions.

The invention is illustrated by the following examples:

*Example 1.—β-Piperidinoethyl benzhydryl ether*

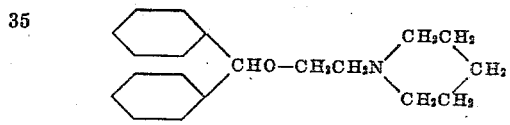

(a) 247 g. of benzhydryl bromide is added to a refluxing solution of 260 g. of β-piperidinoethanol and 100 cc. of toluene. After the addition has been completed, the mixture is refluxed about fifteen hours, cooled and the lower layer consisting of the hydrobromide salt of β-piperidinoethanol drawn off. The upper layer is distilled in vacuo to obtain the desired β-N-piperidinoethyl benzhydryl ether as a colorless liquid.

The free base may also be purified through the acid oxalate acid addition salt. The excess amino alcohol and toluene are distilled from the upper layer of the reaction mixture at atmospheric pressure or at slightly reduced pressure and the residue added to a warm solution of 126 g. of oxalic acid dihydrate in 500 cc. of isopropanol. The crytalline acid oxalate salt which separates from the solution is collected, suspended in water and treated with an excess of 25% potassium hydroxide solution. The free base of the product which separates as an oily layer from the alkaline solution in almost pure form is drawn off and stored as such or used in the preparation of an acid addition salt as described below.

The free base is converted to the hydrochloride salt by dissolving it in dry ethyl ether and adding an excess of dry gaseous hydrogen chloride gas. The precipitated salt is collected and purified by recrystallization from isopropanol; M. P. 168.5–9.5° C. The hydrobromide salt may be prepared in a similar manner and recrystallized from either absolute ethanol-ether mixture or isopropanol.

(b) 18.4 g. of benzhydrol, 5 g. of sodium and 120 g. of xylene are refluxed for ten hours. The solution is cooled and the excess sodium removed. An ether solution containing 18.4 g. of β-piperidinoethyl chloride is added and the mixture refluxed for three hours. The mixture is cooled and treated with water to dissolve the inorganic salts. The organic layer is separated, washed several times with water and then extracted with several portions of 3 N hydrochloric acid. The acid extracts are treated with decolorizing carbon and filtered. The free base is liberated from the acid solution by the addition of 20% sodium hydroxide solution, taken up in ether and the ether extract dried. The ether is distilled and the residue distilled under reduced pressure to obtain the pure free base of β-piperidinoethyl benzhydryl ether. The hydrochloride salt is prepared by dissolving the free base in anhydrous ether and slowly adding an alcoholic solution of hydrogen chloride. The salt is collected and purified by recrystallization from isopropanol; M. P. 168–9° C.

*Example 2—β-Morpholinoethyl benzhydryl ether*

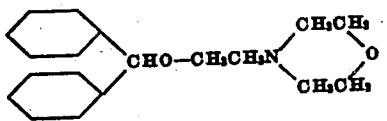

A mixture consisting of 524 g. of β-morpholinoethanol and 65 g. of potassium carbonate is heated at 120° C. and 202.5 g. of benzhydryl chloride added to the stirred mixture over a period of one hour. After the addition has been completed the mixture is stirred and heated for an additional fifteen hours and then the excess amino alcohol distilled off in vacuo. The residue is washed with water to remove the potassium chloride and then added to a warm solution of 126 g. of oxalic acid dihydrate in 500 cc. of isopropanol. The acid oxalate salt of the desired product which separates on cooling is collected, suspended in water and treated with an excess of 30% sodium hydroxide solution in the cold. The free base is extracted with ether, the ether extract dried and then treated with an excess of dry hydrogen chloride gas. The white hydrochloride of β-morpholinoethyl benzhydryl ether is collected and purified by recrystallization from isopropanol; M. P. 182–3° C.

The citrate salt can be prepared by treating an ether solution of the free base with a saturated ether solution of citric acid. The citrate which separates from the solution as a finely divided powder is filtered off and purified by washing it with ether.

250 mg. per day of the compounds of this example given orally or 35 mg. per day by the intravenous route is an adequate dosage in the treatment of smooth muscle spasms and most allergic conditions due to histamine.

*Example 3—β-Thiomorpholinoethyl benzhydryl ether*

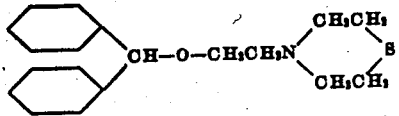

23 g. of sodium wire is added to a solution of 225 g. of β-thiomorpholinoethanol in 500 cc. of dry benzene and the resulting mixture stirred and heated until all the sodium has reacted with the amino alcohol. A solution of 294 g. of benzhydryl iodide in 300 cc. of dry benzene is added slowly to the rapidly stirred and refluxing mixture and after the addition has been completed the mixture is refluxed for fifteen hours. The mixture is cooled, washed with several portions of water to remove the sodium iodide and the organic layer distilled in vacuo to remove the benzene and excess amino alcohol. The residue is treated with an excess of dilute hydrochloric acid and the mixture extracted with ether. The ether extract is discarded and the aqueous solution made alkaline with 20% sodium hydroxide solution in the cold. The free base is extracted with ether, the ether extract dried and treated with an excess of dry hydrogen bromide gas. The hydrobromide salt of the desired β-thiomorpholinoethyl benzhydryl ether which separates is collected and purified by recrystallization from isopropanol.

The compound of this example is used in approximately the same dosages as the compound of Example 2 in the treatment of smooth muscle spasms and allergic conditions due to histamine.

*Example 4—β-Pyrrolidinoethyl benzhydryl ether*

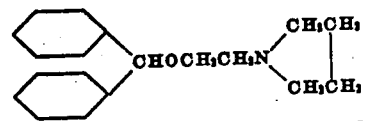

247 g. of benzhydryl bromide is added to a refluxing solution of 115 g. of β-pyrrolidinoethanol and 100 cc. of xylene. After the addition has been completed the mixture is refluxed about fifteen hours, cooled and the lower layer consisting of the hydrobromide salt of β-pyrrolidinoethanol drawn off. The upper layer is distilled in vacuo to obtain the desired β-pyrrolidinoethyl benzhydryl ether as a colorless liquid.

The free base is converted to the hydrochloride salt by dissolving it in dry ethyl ether and adding an excess of dry gaseous hydrogen chloride gas. The precipitated salt is collected and purified by recrystallization from isopropanol. By adding an equivalent amount of sulfuric acid to an ether solution of the free base the sulfate salt may be obtained in the same manner.

*Example 5.—β-Piperidino-α-methylethyl benzhydryl ether*

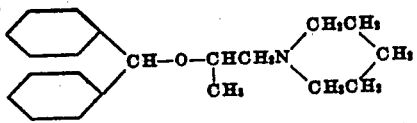

49.4 g. of benzhydryl bromide is added slowly to a refluxing solution of 60 g. of β-piperidino-isopropanol in 150 cc. of xylene and the mixture refluxed for about twenty hours, cooled and the lower layer consisting of the hydrobromide salt of the β-piperidino-isopropanol drawn off. The xylene is removed from the upper layer by distillation and the residue distilled in vacuo to obtain the free base of the desired β-piperidino-α-methylethyl benzhydryl ether.

The free base can be converted to the hydrochloride salt by dissolving it in dry ether and adding an excess of dry isopropanolic hydrogen chloride. The salt which separates as a white solid is collected and purified by recrystallization from isopropanol-ether or isopropanol-ethyl acetate mixture.

Example 6.—γ-Piperidinopropyl benzhydryl ether

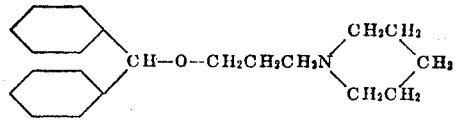

18.4 g. of benzhydrol, 5 g. of sodium and 120 cc. of xylene are refluxed for ten hours, the solution cooled and the excess sodium removed. An ether solution containing 20.2 g. of γ-piperidinopropyl chloride is added and the mixture refluxed for five hours. The reaction mixture is cooled, treated with water to dissolve the inorganic salts and the organic layer separated. The organic layer is extracted with dilute hydrochloric acid, the acidic extracts made alkaline with sodium hydroxide solution and extracted with ether. The combined ether extracts are dried, the ether distilled and the residue distilled under reduced pressure to obtain the desired γ-piperidinopropyl benzhydryl ether as a colorless oil. The hydrobromide salt of this compound can be prepared by dissolving the free base in a small amount of isopropanol and adding an excess of isopropanolic hydrogen bromide. Ether is added and the mixture cooled to obtain the desired hydrobomide salt as a white crystalline solid. This salt can be purified by recrystallization from isopropanol-ethyl acetate mixture.

Example 7.—β-Morpholino-α-methylethyl benzhydryl ether

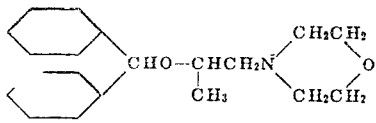

A mixture consisting of 75 g. of β-morpholino-isopropanol and 16.5 g. of anhydrous potassium carbonate is heated at 125° C. while 29.5 g. of benzhydryl bromide is added slowly. After the addition has been completed the mixture is stirred and heated for about fifteen hours and then the excess amino alcohol removed by distillation in vacuo. The residue is washed with water and then added to a warm isopropanol solution containing an equivalent amount of oxalic acid dihydrate. The acid oxalate salt of the desired β-morpholino-α-methylethyl benzhydryl ether which separates is collected, suspended in water and treated with an excess of strong sodium hydroxide solution. The free base is extracted with ether, the ether extract dried and then treated with an excess of dry hydrogen chloride. The white hydrochloride salt of β-morpholino-α-methylethyl benzhydryl ether which separates from the solution is collected and purified by recrystallization from isopropanol-ether mixture.

Example 8.—γ-Thiomorpholinopropyl-4,4'-dichloro benzhydryl ether

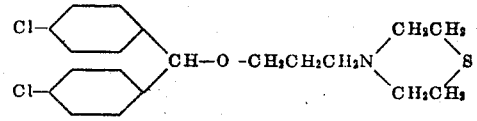

43.3 g. of 4,4'-dichlorobenzhydryl bromide in a small amount of xylene is added slowly to a refluxing solution of 75 g. of γ-thiomorpholinopropanol in 150 cc. of xylene and the resulting mixture refluxed for twelve hours. The mixture is cooled, treated with 250 cc. of water and the organic layer separated. The organic layer is taken up in ether and extracted with an excess of dilute hydrochloric acid. The acidic extracts are made alkaline, extracted with ether and the combined ether extracts dried. The ether is distilled and the excess amino alcohol distilled from the residue as completely as possible under high vacuo. The residue is cooled, taken up in ether, decolorized with activated carbon and the ether solution treated with an excess of dry hydrogen chloride. The hydrochloride salt of the desired γ-thiomorpholinopropyl-4,4'-dichlorobenzhydryl ether which separates is collected and purified by crystallization from isopropanol-ether mixture.

Example 9.—ʆMorpholinohexyl benzhydryl ether

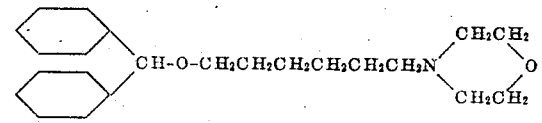

30 g. of benzhydryl bromide is added slowly to a refluxing solution of 75 g. of ʆ-morpholinohexanol in 250 cc. of xylene and the resulting mixture refluxed for about fifteen hours. The reaction mixture is cooled, treated with water and the organic layer separated. The organic layer is diluted with ether, extracted with dilute hydrochloric acid and the acidic aqueous extracts made alkaline with sodium hydroxide solution. The alkaline solution is extracted with ether, the ether extracts dried and the ether distilled. The excess amino alcohol is distilled from the residue under high vacuo and the residue, after solution in a small amount of warm isopropanol, added to a warm solution of isopropanol containing an equivalent amount of oxalic acid dihydrate. The acid oxalate salt of the desired ʆ-morpholinohexyl benzhydryl ether which separates from the solution on cooling is removed, suspended in water and treated with an excess of 30% sodium hydroxide solution. The purified free base is extracted with ether, the ether extracts dried and then treated with an excess of dry hydrogen chloride. The white hydrochloride salt of ʆ-morpholinohexyl benzhydryl ether thus obtained is collected and purified by recrystallization from isopropanol-ether mixture.

Example 10.—γ-Piperidino-β-methylpropyl-2-methylbenzhydryl ether

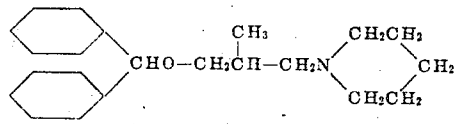

2.94 g. of finely cut sodium is added to a solution of 20 g. of γ-piperidino-β-methylpropanol in 100 cc. of xylene and the resulting mixture refluxed for ten hours. Any sodium remaining undissolved is removed from the mixture and then 26.1 g. of 2-methylbenzhydryl bromide in a small amount of xylene added slowly to the refluxing mixture. The reaction mixture is refluxed for about eight hours, cooled and 300 cc. of cold water added. The organic layer is diluted with ether, removed and extracted with dilute hydrochloric acid. The acidic extracts are made alkaline, extracted with ether and the ether extracts dried. The ether is removed by distillation and the residue distilled in high vacuo to obtain the free base of the desired γ-piperidino-μ-methylpropyl-2-methylbenzhydryl ether.

*Example 11.*—γ-*Morpholino-β,β - dimethylpropyl benzhydryl ether*

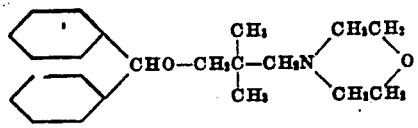

40 g. of benzhydryl bromide is added slowly to a refluxing solution of 70 g. of γ-morpholino-β,β-dimethylpropanol in 150 cc. of benzene and the resulting mixture refluxed for about twenty-four hours. The mixture is cooled, treated with water and the organic layer, after dilution with ether, removed. The organic layer is extracted with dilute hydrochloric acid, the acidic extracts made alkaline with sodium hydroxide solution and extracted with ether. The combined ether extracts are dried, the ether distilled and the residue added to a warm isopropanol solution containing an equivalent amount of oxalic acid dihydrate. The acid oxalate salt which separates is removed, suspended in water and treated with an excess of 30% sodium hydroxide solution. The alkaline solution is extracted with ether, the combined ether extracts dried and the ether solution containing the free base of γ-morpholino-β,β-dimethylpropyl benzhydryl ether treated with an excess of dry hydrogen bromide. The hydrobromide salt of γ-morpholino-β,β-dimethylpropyl benzhydryl ether which separates from the solution is collected and purified by recrystallization from isopropanol-ether mixture.

*Example 12.*—ζ - *Piperidino-μ-methylbutyl - 4,4'-dimethoxybenzhydryl ether*

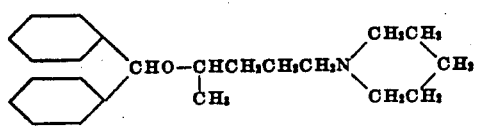

30.7 g. of 4,4'-dimethoxybenzhydryl bromide dissolved in a small amount of toluene is added slowly to a refluxing solution of 50 g. of 1-piperidino-4-pentanol in 150 cc. of toluene and the resulting mixture heated under reflux for about twenty hours. The reaction mixture is cooled and 200 cc. of ether and 300 cc. of water added. After thorough mixing, the organic layer is separated, extracted with dilute acid and the combined acidic extracts made alkaline with 10 N sodium hydroxide solution. The alkaline mixture is extracted with ether, the ether extracts dried and the ether distilled. The excess amino alcohol is distilled from the residue as completely as possible under high vacuo and the residue added to a warm isopropanol solution containing one equivalent of oxalic acid dihydrate. The acid oxalate salt of the base which separates on cooling is removed, suspended in water and treated with an excess of strong sodium hydroxide solution. The purified free base which is liberated is extracted with ether, the ether extracts dried and the ether distilled. The residual light yellow oil consists of the free base of the desired ζ-piperidino-α-methylbutyl-4,4'-dimethoxybenzhydryl ether.

Some further examples of the compounds of the invention which may be prepared by application of the above described methods are:

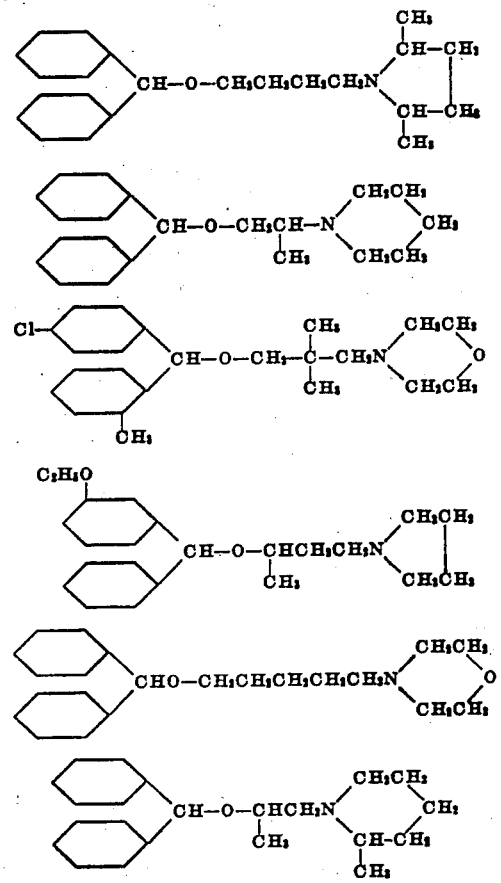

In its broader aspects the invention includes the quaternary ammonium, as well as the acid addition, salts of the free bases of the new basically substituted benzhydryl ethers. These quaternary ammonium salts are prepared by reacting an alkyl or aralkyl halide, a dialkyl sulfate or an alkyl aryl sulfonate with the free base of the benzhydryl ethers. The quaternary ammonium halides can also be prepared by the reaction of an ω-haloalkyl benzhydryl ether compound with an N-alkyl or N-aralkyl substituted piperidine, morpholine, thiomorpholine or pyrrolidine. Some examples of the compounds falling within the scope of this phase of the invention are: γ-benzhydryloxypropyl methyl piperidinium bromide, β-benzhydryloxypropyl benzyl piperidinium chloride, ζ-benzhydryloxyhexyl methyl morpholinium methosulfate and the like. These enumerated compounds as well as others of the same type may be prepared in accordance with the methods which I have fully disclosed and claimed with reference to certain preferred classes of the quaternary ammonium compounds of the invention in my copending applications, Serial Nos. 640,685, 640,686 and 640,687, all filed January 11, 1946.

Attention is called to the fact that compounds somewhat related to those claimed herein are described and claimed in my copending applications as follows: Serial No. 660,406, filed April 8, 1946; Serial No. 688,424, filed August 5, 1946; Serial No. 688,425, filed August 5, 1946; Serial No. 688,426, filed August 5, 1946; Serial No. 688,427, filed August 5, 1946; Serial No. 739,985, filed April 8, 1947; Serial No. 751,984, filed June 2, 1947; Serial No. 751,985, filed June 2, 1947; Serial No. 780,099, filed October 15, 1947; and Serial No. 33,432, filed June 16, 1948.

What I claim as my invention is:

1. A compound of the class consisting of a free base, its acid addition salts, and hydrocarbon halide, hydrocarbon sulfate and hydrocarbon sulfonate quaternary salts, said free base having the formula,

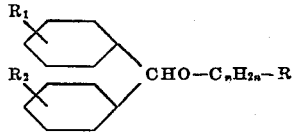

where $n$ is an integer of 2 to 6 inclusive, R is a member of the class consisting of piperidino, morpholino, thiomorpholino and pyrrolidino radicals and $R_1$ and $R_2$ are members of the class consisting of hydrogen, halogen, lower alkyl and lower alkoxy.

2. A compound of the class consisting of a free base, its acid addition salts, and hydrocarbon halide, hydrocarbon sulfate and hydrocarbon sulfonate quaternary salts, said free base having the formula,

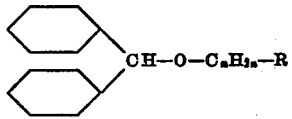

where $n$ is an integer of 2 to 6 inclusive and R is a member of the class consisting of piperidino, morpholino, thiomorpholino and pyrrolidino radicals.

3. A compound of the class consisting of a free base, its acid addition salts, and hydrocarbon halide, hydrocarbon sulfate and hydrocarbon sulfonate quaternary salts, said free base having the formula,

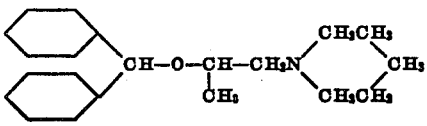

4. A compound of the class consisting of a free base, its acid addition salts, and hydrocarbon halide, hydrocarbon sulfate and hydrocarbon sulfonate quaternary salts, said free base having the formula,

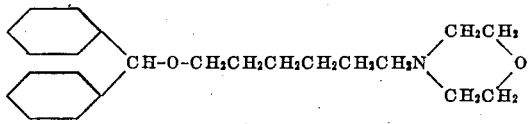

5. A compound of the class consisting of a free base, its acid addition salts, and hydrocarbon halide, hydrocarbon sulfate and hydrocarbon sulfonate quaternary salts, said free base having the formula,

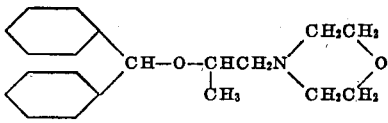

6. A compound of the formula,

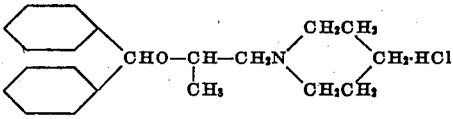

7. A compound of the formula,

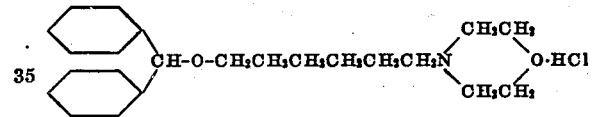

8. A compound of the formula,

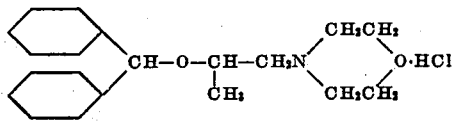

GEORGE RIEVESCHL, JR.

No references cited.